(12) United States Patent
Kumar et al.

(10) Patent No.: US 8,978,801 B2
(45) Date of Patent: Mar. 17, 2015

(54) HOIST SYSTEM AND METHOD

(75) Inventors: Ajith Kuttannair Kumar, Erie, PA (US); Henry Todd Young, Erie, PA (US); Bertrand Bastien, Erie, PA (US)

(73) Assignee: General Electric Company, Schenectady, NY (US)

( * ) Notice: Subject to any disclaimer, the term of this patent is extended or adjusted under 35 U.S.C. 154(b) by 291 days.

(21) Appl. No.: 13/879,728

(22) PCT Filed: Jul. 26, 2010

(86) PCT No.: PCT/US2010/043239
§ 371 (c)(1),
(2), (4) Date: Apr. 16, 2013

(87) PCT Pub. No.: WO2011/017053
PCT Pub. Date: Feb. 10, 2011

(65) Prior Publication Data
US 2013/0248262 A1    Sep. 26, 2013

Related U.S. Application Data

(60) Provisional application No. 61/228,968, filed on Jul. 27, 2009.

(51) Int. Cl.
*B60K 6/485*    (2007.10)
*B60L 1/00*    (2006.01)
(Continued)

(52) U.S. Cl.
CPC ... *B60L 1/00* (2013.01); *B60K 6/46* (2013.01); *B60L 1/003* (2013.01); *B60L 11/123* (2013.01);
(Continued)

(58) Field of Classification Search
CPC ....... B60L 7/16; B60L 11/1803; B60L 1/003; B60K 6/20; B60K 6/22; B60K 6/26; B60K 6/485; E02F 9/2246; E02F 9/2242
USPC ............... 180/53.8, 65.25; 417/44.1, 410.1
See application file for complete search history.

(56) References Cited

U.S. PATENT DOCUMENTS 7,318,580 B2 * 1/2008 Johnston et al. ............... 254/362
7,596,893 B2 * 10/2009 Tozawa et al. .................. 37/348
(Continued)

FOREIGN PATENT DOCUMENTS

CN    101386260 A    3/2009
EP    1 889 977 A1    2/2008
(Continued)

OTHER PUBLICATIONS

Search Report and Written Opinion for corresponding PCT Application No. PCT/US2010/043239, dated Nov. 25, 2011.
(Continued)

*Primary Examiner* — Paul N Dickson
*Assistant Examiner* — Timothy Wilhelm
(74) *Attorney, Agent, or Firm* — GE Global Patent Operation; John A. Kramer

(57) ABSTRACT

A system includes a motor coupled to an energy source and coupled to a hoist pump. During one mode of use or operation, the motor cars receive electricity from the energy source and provide mechanical power to the hoist pump. A method includes directing a motor to mechanically couple to the hoist pump, and directing electrical power to flow from an energy source to the motor, and thereby to control the speed of hoist activity.

11 Claims, 5 Drawing Sheets

(51) Int. Cl.

| | | |
|---|---|---|
| *B60K 6/46* | (2007.10) | |
| *B60L 11/12* | (2006.01) | |
| *B60L 11/14* | (2006.01) | |
| *B60W 10/02* | (2006.01) | |
| *B60W 10/08* | (2006.01) | |
| *B60W 10/26* | (2006.01) | |
| *B60W 10/30* | (2006.01) | |
| *B60K 6/00* | (2006.01) | |
| *B60L 11/18* | (2006.01) | |
| *B60K 1/02* | (2006.01) | |
| *B60W 20/00* | (2006.01) | |

(52) U.S. Cl.
CPC ................ *B60L 11/14* (2013.01); *B60W 10/02* (2013.01); *B60W 10/08* (2013.01); *B60W 10/26* (2013.01); *B60W 10/30* (2013.01); *B60K 6/00* (2013.01); *B60L 11/12* (2013.01); *B60L 11/18* (2013.01); *B60K 1/02* (2013.01); *B60L 2240/421* (2013.01); *B60W 20/00* (2013.01); *B60W 2710/081* (2013.01); *Y02T 10/6217* (2013.01); *Y02T 10/642* (2013.01); *Y02T 10/70* (2013.01); *Y02T 10/7077* (2013.01); *B60L 2200/40* (2013.01)

USPC .................... 180/65.25; 180/53.8; 417/410.1; 417/44.1

(56) References Cited

U.S. PATENT DOCUMENTS

| | | | |
|---|---|---|---|
| 8,047,317 B2* | 11/2011 | Mari Curbelo et al. | .... 180/65.29 |
| 8,292,777 B2 | 10/2012 | Puccetti et al. | |
| 2008/0081734 A1* | 4/2008 | Duffy et al. | .................... 477/107 |
| 2009/0095549 A1* | 4/2009 | Dalum et al. | ............ 180/65.265 |

FOREIGN PATENT DOCUMENTS

| | | |
|---|---|---|
| JP | 2006205777 A | 8/2006 |
| JP | 2006233843 A | 9/2006 |
| WO | 2009083750 A1 | 7/2009 |

OTHER PUBLICATIONS

Unofficial English translation of Office Action issued in connection with corresponding CN Application No. 201080044358.4 on Sep. 10, 2014.

Unofficial English translation of Office Action issued in connection with corresponding JP Application No. 2012-522938 on Jun. 3, 2014.

* cited by examiner

HOIST SYSTEM AND METHOD

BACKGROUND

1. Technical Field

The invention includes embodiments that relate to a hoist system, a vehicle having the hoist system, and one or more associated methods.

2. Discussion of Art

In a current off-highway vehicle (OHV) application, an engine of the OHV directly mechanically drives one or more hydraulic pumps. These pumps supply hydraulic pressure for hoist, steering, and other applications. Because of the direct engine-pump connection, the pumps necessarily run at a speed proportional to engine speed. While this provides some efficiencies, a drawback to this approach is that engine speed needs to be increased in response to a load demand on these pumps (e.g., in the case of a dumper or haul truck, when the truck bed is hoisted), and this may be undesirable due to the commensurate fuel consumption, emissions, noise, and the like that accompany increased engine speed. Further, the speed of response time may be undesirably slow due to the engine speed ramp rates. Additionally, the pumps need to run at the high engine speeds even when the demand on the pumps is low.

Therefore, it may be desirable to have a system or vehicle with properties and characteristics that differ from those properties of currently available systems and vehicles. It may be desirable to have a method that differs from those methods currently available.

BRIEF DESCRIPTION

An embodiment relates to a hoist system. The hoist system includes a hoist pump and an electric motor. The electric motor is coupled to an energy source and to the hoist pump. During a first mode of operation, the electric motor receives electricity from the energy source and thereby provides mechanical power to the hoist pump. During a second mode of operation, the electricity from the energy source is used otherwise than for powering the hoist pump.

In another embodiment, the energy source includes an alternator and an engine mechanically coupled to the alternator. Hie engine is operable to drive the alternator, with the alternator in turn generating the electricity. The engine is mechanically decoupled from the hoist pump (e.g., the hoist pump is neither directly nor indirectly mechanically drivers by an engine). This allows the alternator to electrically power the electric motor during the first mode of operation, for powering the hoist pump, without hoist pump operation being tied to engine speed or vice versa.

In another embodiment, the electric motor is a traction motor or an auxiliary motor reversibly coupled to the hoist pump. During the first mode of operation, the traction motor or auxiliary motor receives the electricity from the alternator and thereby provides the mechanical power to the hoist pump. During the second mode of operation, the traction motor or auxiliary motor is decoupled from the hoist pump, and the traction motor or auxiliary motor receives the electricity from the alternator to mechanically drive a propulsion system or an auxiliary system, respectively, and not the hoist pump.

In another embodiment, the electric motor is a hoist pump motor. The system further includes a controller and a traction motor or auxiliary motor. The energy source further includes a power electronics unit, which may be electrically connected to an output of the alternator or otherwise. During the first mode of operation, the controller controls the power electronics unit to provide the electricity to the hoist pump motor, and not to the traction motor or auxiliary motor. During the second mode of operation, the controller controls the power electronics unit to provide the electricity to the traction motor or auxiliary motor, and not the hoist pump motor. Thus, in the first mode electricity is provided to the hoist pump motor for driving the hoist pump, and in the second mode electricity is provided to the traction motor or auxiliary motor to mechanically drive a propulsion system or an auxiliary system, respectively.

Another embodiment relates to a method for operating a system in a first mode of operation and a second mode of operation. In the first mode of operation, electrical power is directed to flow from an energy source to an electric motor. The electric motor is coupled to the energy source and to a hoist pump. The electric motor is powered with the electrical power, to run the electric motor for providing mechanical power to the hoist pump. In the second mode of operation, the system is switched to using the electrical power otherwise than for powering the hoist pump. If the system includes a motor and alternator as (at least part of) the energy source, it may be the case that the engine is neither mechanically nor otherwise operatively coupled to the hoist pump; the alternator electrically powers the electric motor during the first mode of operation, for powering the hoist pump, without hoist pump operation being tied to engine speed or vice versa. In an embodiment, the first and second modes of operation are realized by switching use of a traction motor or auxiliary motor between powering the hoist pump (in the first mode) and powering a propulsion system or auxiliary load, respectively. In another embodiment, the first and second modes of operation are realized by switching the output of a power electronics unit (such as a traction motor driver) from providing power to a hoist pump motor and providing power to a traction motor or auxiliary motor.

DESCRIPTION OF FIGURES

The drawings illustrate embodiments contemplated for carrying out the invention. Like reference numbers represent the same, or similar, parts where used.

DETAILED DESCRIPTION

The invention includes embodiments that relate to a hoist system, a vehicle having the hoist system, and one or more associated methods. As used herein, "hoist" refers to a device used for lifting or lowering a load. The hoist may employ a hydraulic cylinder or other hydraulic device, or a drum around which a cable wraps, A hoist pump is a hydraulic or other pump that is mechanically driven for carrying out a work function in or of the hoist. An example of a hoist pump is a hydraulic pump that pumps hydraulic fluid into a hydraulic cylinder that is part of a hoist mechanism.

Generally, certain embodiments relate to systems and methods where a hoist pump is mechanically decoupled from an engine (such as an engine in a dumper or haul truck), and the hoist pump, instead of being directly or indirectly mechanically powered by the engine, is driven/operated using an electric motor. In one embodiment, the electric motor may be a traction motor that is selectively coupled to and decoupled from the hoist pump, such that in one mode of operation the traction motor provides mechanical power to the hoist pump and in another mode of operation the traction motor provides mechanical power to a propulsion system. ("Propulsion system" refers to equipment used to move a vehicle or other load, such as a transmission and wheel set. For instances herein where a traction motor is described as interacting with a propulsion system, where the traction motor might be conceptualized as part of the propulsion system, the propulsion system may be understood as referring to part(s) of the propulsion system other than the traction motor.) In another embodiment, electrical power is selectively provided to a hoist pump motor by itself, to a traction motor by itself, and/or both together, depending on a mode of operation. This may involve switching the output of a power electronics unit (such as a traction motor driver) from providing electrical power to the traction motor to providing electrical power to the hoist pump motor. Thus, in one aspect, rather than syphon off mechanical torque from the engine, the hoist pump is driven using an electrically powered motor. If electricity for powering the hoist pump is provided by an alienator (coupled to the engine), the engine can operate at any set speed sufficient to drive the alternator to supply enough electrical energy to the electric motor. Hoist speed can be regulated by the amount of electrical current passed through to the electric motor, rather than engine speed or even alternator output.

Figure 1:
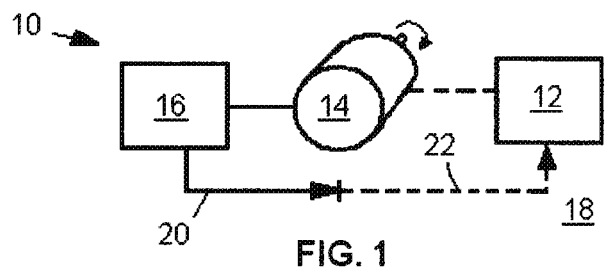
FIGS. 1 and 2 are schematic representations of a hoist system, according to an embodiment of the invention, in first and second modes of operation, respectively.
Figure 2:
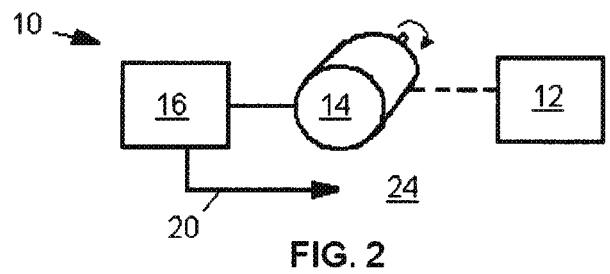

In an embodiment, a hoist system, having a plurality of operating modes, comprises an electric motor coupled to an energy source and coupled (reversibly or otherwise) to a hoist pump. During one mode of operation, the electric motor receives electricity from the energy source and provides mechanical power to the hoist pump. FIGS. 1 and 2 illustrate an example of such a hoist system 10. The hoist system 10 includes a first hoist pump 12 and a first electric motor 14. The first electric motor 14 is coupled to an energy source 16 and to the first hoist pump 12. During a first mode of operation 18 (FIG. 1), the first electric motor 14 receives electricity 20 from the energy source 16 and thereby provides mechanical power 22 to the first hoist pump 12. During a second mode of operation 24 (FIG. 2), the electricity from the energy source is used otherwise than for powering the first hoist pump 12. ("Used otherwise" includes used for another purpose, stored, dissipated, or not used at all. Examples include powering the electric motor but where the electric motor is used for some other purpose other than driving the hoist pump, and routing the electricity to a device other than the electric motor.) The system 10 may be outfitted with a controller and/or power electronics unit as discussed herein.

Figure 3:
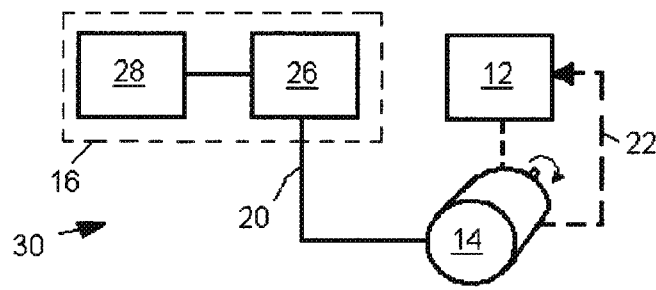
FIG. 3 is a schematic representation of a hoist system, according to another embodiment.

In another embodiment, with reference to FIG. 3, the energy source 16 of a hoist system 30 includes an alternator 26 and an engine 28 mechanically coupled to the alternator 26. The engine 28 is operable to drive the alternator 26, with the alternator 26 in turn generating the electricity 20. The engine 28 is neither directly nor indirectly mechanically coupled to the first hoist pump 12. (The hoist pump 12 is not mechanically driven by an engine.) This allows the alternator 26 to electrically power the first electric motor 14 during the first mode of operation, for powering the first hoist pump 12, without hoist pump operation being tied to engine speed or vice versa. The system 30 may be outfitted with a controller and/or power electronics unit as discussed herein.

Figure 4:
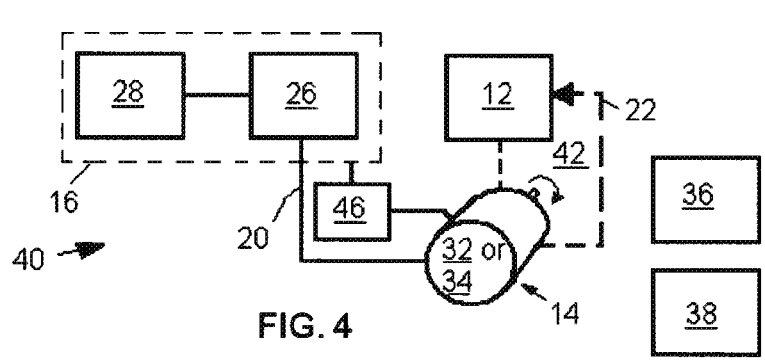
FIGS. 4 and 5 are schematic representations of a hoist system, according to another embodiment of the invention, in first and second modes of operation, respectively.
Figure 5:
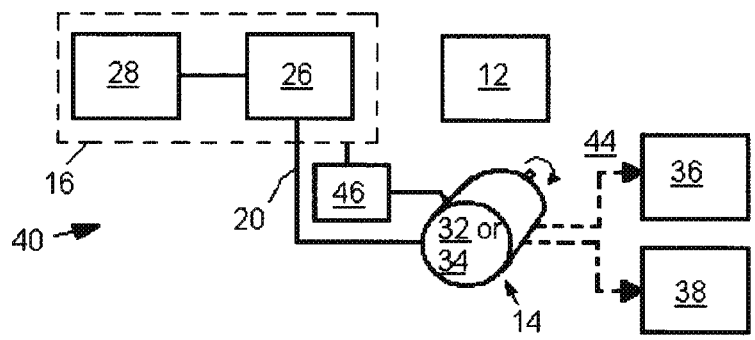

In another embodiment of a hoist system 40, with reference to FIGS. 4 and 5, the first electric motor 14 is a traction motor 32 or an auxiliary motor 34 reversibly coupled to the first hoist pump 12. During a first mode of operation 42 (FIG. 4), the traction motor 32 or auxiliary motor 34 receives the electricity 20 from the alternator 26 and provides the mechanical power 22 to the first hoist pump 12. During a second mode of operation 44 (FIG. 5), the traction motor 32 or auxiliary motor 34 is decoupled from the first hoist pump 12, and the traction motor 32 or auxiliary motor 34 receives the electricity 20 from the alternator 26 to mechanically drive a propulsion system 36 or art auxiliary system 38, respectively, and not the first hoist pump 12.

The system 40 may further comprise a controller 46 (e.g., microcontroller, computer, or other electronics control unit). If so, in an embodiment, the controller 42 is operable to direct the traction motor or auxiliary motor to couple to the first hoist pump 12 in the first mode of operation 42, and to the propulsion system or auxiliary system in the second mode of operation 44. The controller 46 is operable to regulate the electricity from the alternator to the traction motor or auxiliary motor, and thereby to control a speed of the first hoist pump, in the first mode of operation. ("Regulate" means to control the electricity provided to the motor, such as stopping or starring the flow of electricity, and/or controlling the amount and characteristics of the electricity provided.) In one mode of operation of the controller 46, the controller modifies the speed of the first hoist pump 12 without modifying speed or other operation of the engine 28.

Figure 6:
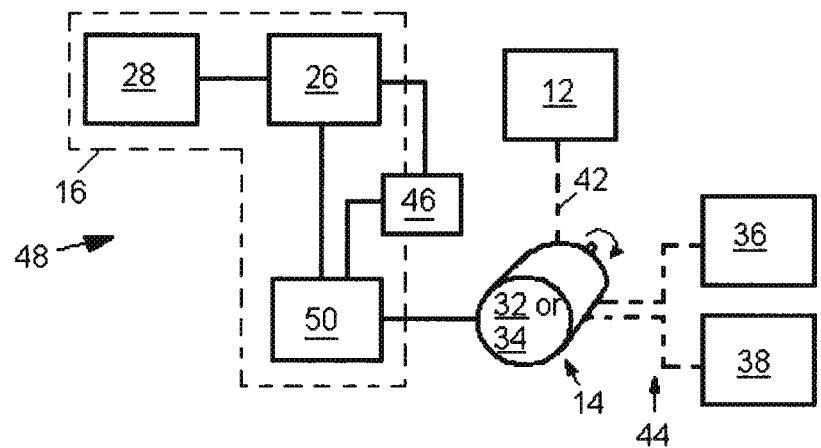
FIGS. 6-11 are schematic representations of respective hoist systems, according to various embodiments of the invention.

In another embodiment of a hoist system 48, with reference to FIG. 6, the energy source 16 further comprises a power electronics unit 50 electrically connected between an output of the alternator 26 and an input of the traction motor 32 or auxiliary motor 34. The controller 46 is operably connected to the power electronics unit 50 for controlling the power electronics unit 50 to regulate the electricity provided from the alternator to the traction motor or auxiliary motor. The power electronics unit 50 may include one or more of a motor driver (circuitry, such as a variable speed inverter drive, for taking a power input and outputting signals configured to drive a motor), inverters, power transistors and other power elements, circuit protection equipment and switching elements.

Figure 7:
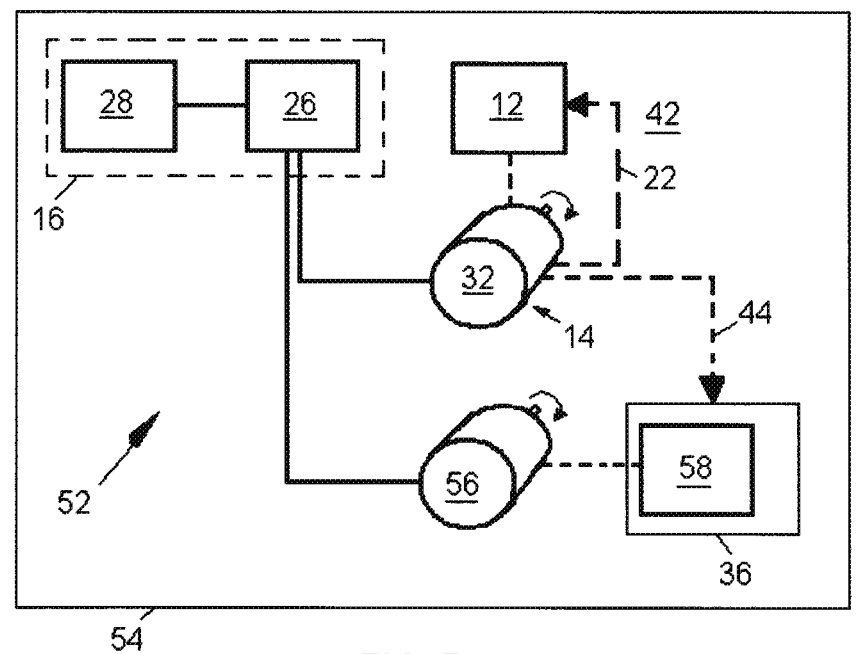

In another embodiment of a hoist system 52, with reference to FIG. 7, the system 52 is mounted in a vehicle 54, and the first electric motor 14 (motor for driving a hoist pump) is a first traction motor 32. The system 52 further comprises a second traction motor 56 (second electric motor) that is coupled to a wheel 58 of the vehicle 54 (the wheel part of a propulsion system 36 of the vehicle) such that when the first traction motor 32 is providing the mechanical power 22 to the first hoist pump 12, the second traction motor 56 is propelling the wheel 5S to move the vehicle 54. The system 52 may be outfitted with a controller and/or power electronics unit as discussed herein.

Figure 8:
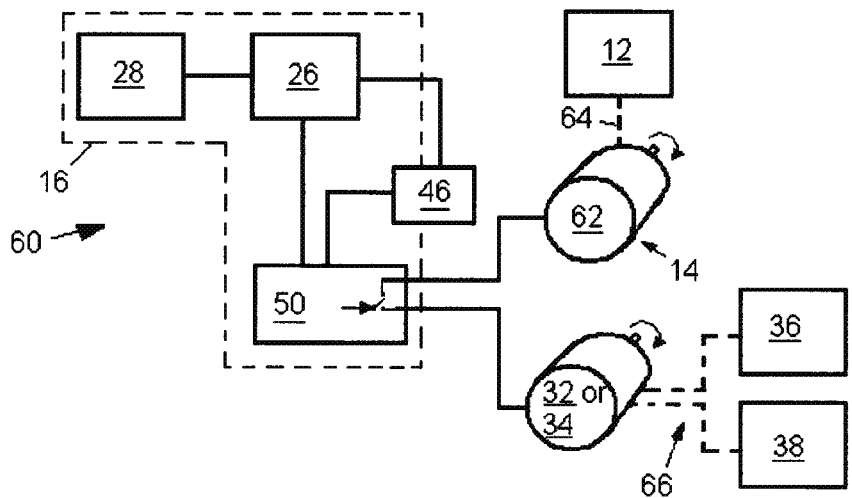

In another embodiment of a hoist system 60, with reference to FIG. 8, the first electric motor 14 is a hoist pump motor 62. The system 60 further includes a controller 46, a traction motor 32 or auxiliary motor 34 (second electric motor), and a power electronics unit 50, which may be electrically connected to an output of the alternator 26 or otherwise. During a first mode of operation 64, the controller 46 controls the power electronics unit 50 to provide the electricity to the hoist pump motor 62, and not to the traction motor 32 or auxiliary motor 34. During a second mode of operation 66, the controller 46 controls the power electronics unit 50 to provide the electricity to the traction motor 32 or auxiliary motor 34, and not the hoist pump motor 62. Thus, in the first mode 64, electricity is provided to the hoist pump motor for driving the hoist pump 12, and in the second mode 66, electricity is provided to the traction motor or auxiliary motor to mechanically drive a propulsion system 36 or an auxiliary system 38, respectively. In addition to the first and second modes, there may be a third mode of operation. In the third mode of operation, the controller would control the power electronics unit to provide the electricity to both the hoist pump motor and to the traction motor or auxiliary motor, for the hoist pump motor to provide the mechanical power to fee first hoist pump and for the traction motor or auxiliary motor to concurrently mechanically drive the propulsion system or the auxiliary system, respectively.

Figure 9:
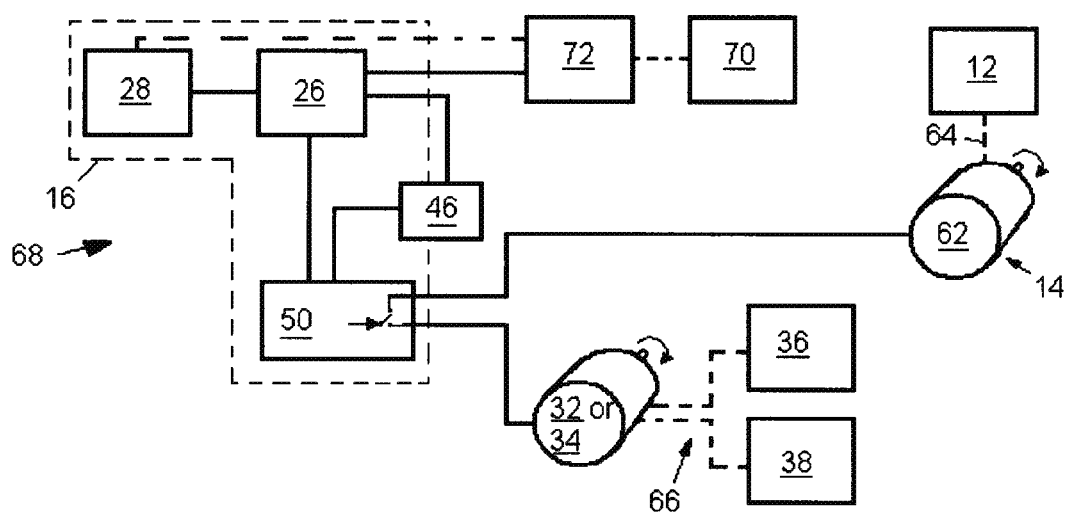

According to another aspect of the invention, a hoist system (10, 30, 40, 48, 52, 60, 74, or otherwise) may include a second hoist pump that is mechanically coupled to the motor, directly or indirectly. As an example, with reference to FIG. 9, a hoist system 68 includes a second hoist pump 70 feat is mechanically coupled to the engine 28. The second hoist pump 70 may be mechanically directly coupled to the engine 28, or indirectly mechanically coupled to the engine 28, such as through a steering pump 72 that is itself mechanically coupled to the engine. In an embodiment, the second hoist pump is relatively smaller in capacity than the first hoist pump. Hie second hoist pump remains coupled to the engine (directly or via a steering pump) to receive mechanical torque from the engine, and when needed the first hoist pump is employed to provide hydraulic lift to the hoist mechanism in conjunction with the second hoist pump. The first host pump thereby acts as a hoist pump booster in another aspect, the smaller, mechanically coupled, second hoist pump may circulate cooling fluid (such as oil) to the brakes in a wet brake system. This allows for cooling of the brakes to be performed while the vehicle is moving. And, a high level of coolant flow may be achieved even with a relatively lower engine speed.

Figure 10:
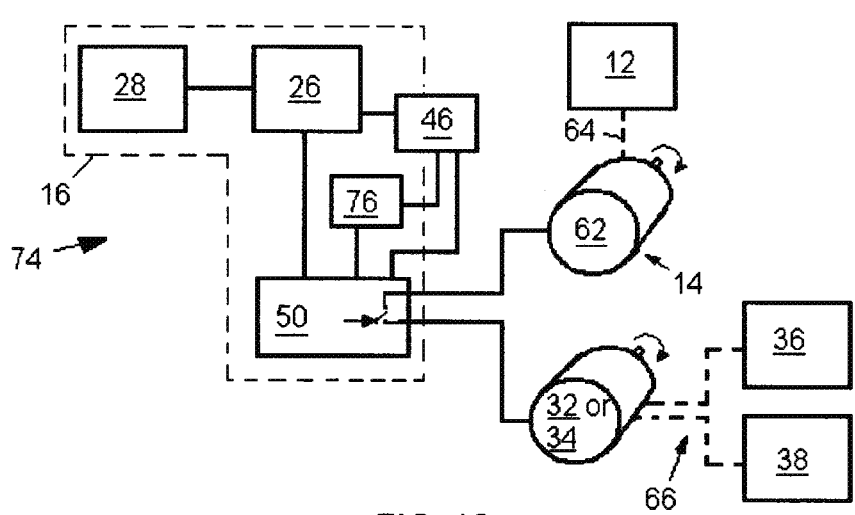

According to another aspect of the invention, a hoist system (10, 30, 40, 48, 52, 60, 68, or otherwise) may include an energy storage device (e.g., comprising or part of the energy source) that is electrically coupled to the first electric motor (the motor used to drive the hoist pump, e.g., a hoist pump motor, or a traction motor or auxiliary motor). The energy storage device provides the electricity to the first electric motor at least during part of a rime when the engine 28 is not operating and the alternator 26 is thereby not supplying the electricity. The energy storage device allows the motor to drive the hoist pump even if the engine is not operating and the alternator is not supplying electricity to the motor. As an example, with reference to FIG. 10, a hoist system 74 comprises an energy storage device 76 that is electrically coupled to a power electronics unit 50. A controller 46 is configured to control the energy storage device 76 and/or the power electronics unit 50 for the energy storage device 76 to selectively provide electricity to the power electronics unit 50 (e.g., for powering a motor that runs a hoist pump).

Figure 11:
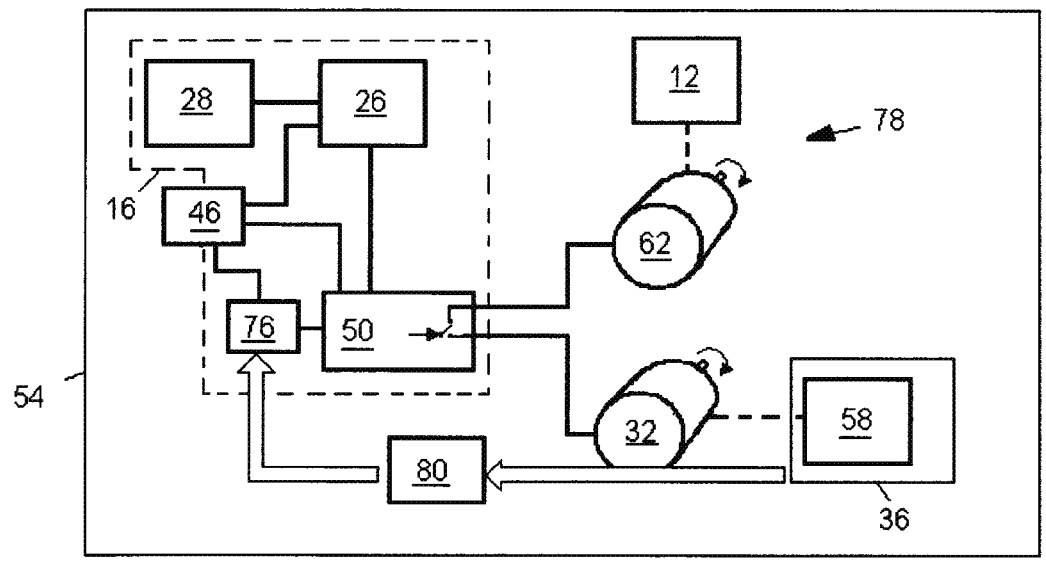

According to another aspect of the invention, for hoist systems provided with an energy storage device, the hoist system (10, 30, 40, 48, 52, 60, 68, 74 or otherwise) may be mounted in a vehicle having a regenerative braking system. The energy storage device is coupled to the regenerative braking system, from which the energy storage device can be charged during a braking event. As an example, with reference to FIG. 11, a hoist system 78 is mounted in a vehicle 54. The vehicle has a regenerative braking system 80. An energy storage device 76 is coupled to the regenerative braking system 80, from which the energy storage device 76 east be charged during a braking event of the vehicle. (For example, the system may be configured such that when the vehicle is braked, a load of the propulsion system is placed on a traction motor, with the traction motor being moved by the propulsion system and thereby generating electricity.)

Figure 12:
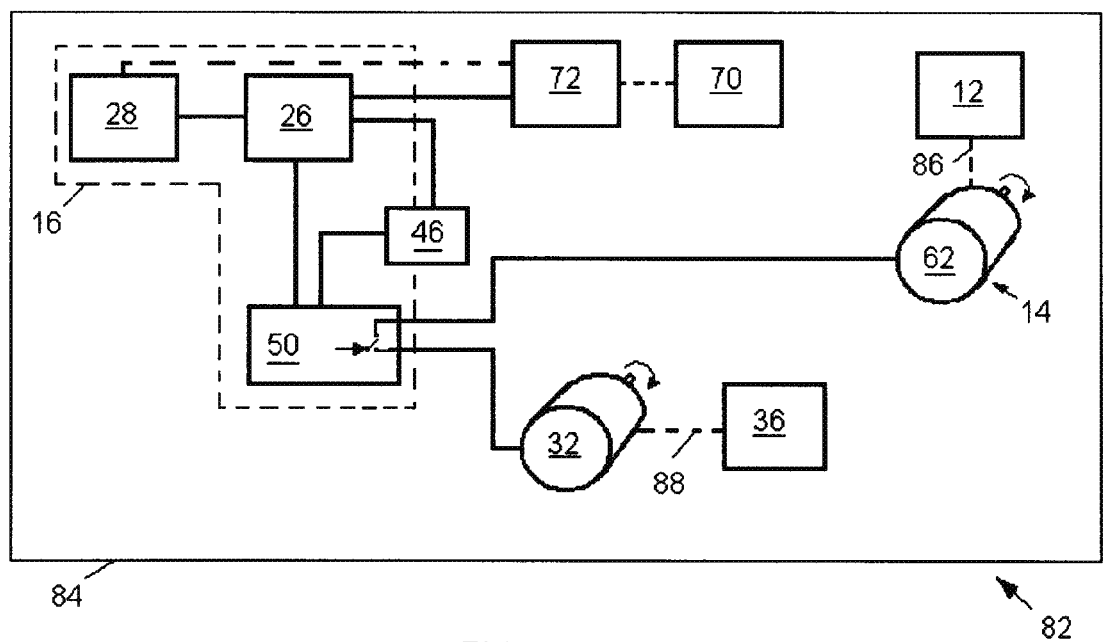
FIGS. 12 and 13 are schematic representations of respective vehicles, according to two embodiments of the invention.

As noted, embodiments of the invention may be implemented in or as a vehicle. FIG. 12 illustrates another example. Here, a vehicle 82 includes a chassis 84, an energy source 16 disposed in the chassis 84, a controller 46 disposed in the chassis 84, a hoist pump motor 62 and a hoist pump 12 disposed in the chassis 84, and a traction motor 32 and a propulsion system 36 disposed in the chassis 84. The energy source 16 includes an engine 28, an alternator 26 coupled to the engine 28, and a power electronics unit 50. The controller 46 is operably coupled to the energy source 16. The hoist pump motor 62 is mechanically coupled to the hoist pump 12 and electrically coupled to the power electronics unit 50. The engine 28 is neither mechanically nor otherwise operatively coupled to the hoist pump 12. The traction motor 32 is mechanically coupled to the propulsion system 36 and electrically coupled to the power electronics unit 50. In a first mode of operation 86, the controller 46 controls the power electronics unit 50 for the power electronics unit 50 to provide electrical power to the hoist pump motor 62. When powered in this manner, the hoist pump motor 62 provides mechanical power to the hoist pump 12. The speed of the hoist activity is controlled by way of the controller 46 regulating the flow of electrical power from the power electronics unit to the hoist pump motor. In a second mode of operation 88, the controller 46 controls the power electronics unit 50 for the power electronics unit 50 to provide electrical power to the traction motor 32 and not the hoist pump motor. When powered in this manner, the fraction motor 32 provides mechanical power to the propulsion system 36 for moving the vehicle 82. The vehicle 82 may include a steering pump 72 (mechanically coupled to the engine) and a second hoist pump 70 directly or indirectly mechanically coupled to the engine.

Figure 13:
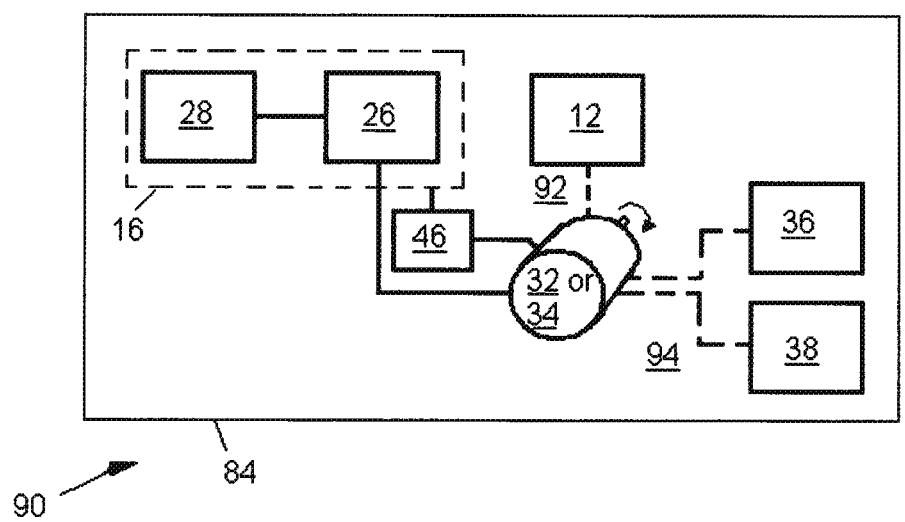

In another embodiment of a vehicle, the vehicle comprises: a chassis; an energy source disposed in the chassis and comprising an engine and an alternator coupled to the engine; a hoist pump disposed in the chassis, wherein the engine is neither mechanically nor otherwise operatively coupled to the hoist pump; a controller disposed in the chassis and operably coupled to the energy source; and a traction motor or an auxiliary motor controllable between first and second modes of operation. In the first mode of operation, the traction motor or the auxiliary motor is coupled with the hoist pump, and in the second mode of operation the traction motor or the auxiliary motor is coupled with a propulsion system of the vehicle or an auxiliary system of the vehicle, respectively. The controller is operable to selectively control the traction motor or auxiliary motor to the first mode of operation and to the second mode of operation, and to control the energy source for supplying electrical power to the traction motor or auxiliary motor. Thus, during the first mode of operation, the traction motor or auxiliary motor receives electrical power from the energy source and mechanically drives the hoist pump. The controller controls the flow of the electrical power, and thereby controls the speed of the hoist activity. During the second mode of operation, the traction motor or auxiliary motor is decoupled from the hoist pump; the traction motor or auxiliary motor receives the electrical power from the energy source and mechanically drives the propulsion system or auxiliary system, respectively, and not the hoist pump. An example of such a vehicle 90 is shown in FIG. 13, with the first and second modes of operation being illustrated by 92 and 94, respectively.

Another embodiment relates to a method for operating a hoist system. The hoist system is operated in first and second modes of operation. The method comprises, in the first mode of operation, directing electrical power to flow from an energy source to a first electric motor. The first electric motor is coupled to the energy source and to a first hoist pump. The method further comprises, in the first mode of operation, powering the first electric motor with the electrical power, in order for the first electric motor to provide mechanical power to the first hoist pump. In the second mode of operation, the system is switched from (i) the first electric motor providing the mechanical power to the first hoist pump to (ii) using the electrical power otherwise than for powering the first hoist pump.

Another embodiment of the method includes additional or alternative steps for when the first electric motor is a traction motor. Here, the method further comprises, in the first mode of operation, directing the traction motor to mechanically decouple from a propulsion device and to couple to the first hoist pump. In the second mode of operation, the traction motor is directed to mechanically decouple from the first hoist pump and to couple to the propulsion device.

Another embodiment of the method includes additional or alternative steps for when the energy source includes an engine and an alternator, the engine driving the alternator for generating the electrical power. Here, the method further comprises, in the first mode of operation, the first electric motor modifying a speed of the first hoist pump without modifying speed or other operation of the engine. The first hoist pump is neither directly nor indirectly mechanically coupled to the engine.

Another embodiment of the method includes additional or alternative steps for when the first electric motor is a hoist pump motor. Here, the method further comprises, in the second mode of operation, using the electrical power to run a second electric motor and not the hoist pump motor. The second electric motor is a traction motor or an auxiliary motor.

According to one aspect, a hoist activity is controlled by regulating the supply of electrical power to an electric motor that drives a hoist pump, where the hoist pump is mechanically decoupled from an engine. (In particular, the hoist pump is not mechanically driven, directly or indirectly, by an engine.) The hoist activity may be modified without modifying engine speed or operation. If the hoist activity is hoisting speed, engine speed is unmodified when the hoisting speed is modified. For a dumper or haul truck, for example, dumping a load may be controlled in response to the hoist activity.

Electricity to power a motor for driving a hoist pump may be supplied by a power electronics unit, e.g., a traction driver (variable speed inverter drive) or an auxiliary driver. The power electronics unit may be connected to the alternator/rectifier. During operation, when a hoist pump is required for use, a traction driver may be disconnected from a traction motor, or an auxiliary driver may be operationally disconnected from an auxiliary motor (e.g., radiator fan motor, traction motor blower, alternator blower, or the like). Once operationally disconnected from its first operational mode, the driver (power electronics unit) may then be used to drive a motor for a hoist pump.

Functionally, the engine speed can be decoupled from the hoist pump speed. Additionally, for systems with an energy storage device, the motor for driving the hoist pump can be run from the electricity stored in an energy storage device. The engine speed can be chosen to provide optimal fuel efficiency depending on the required load. The pump motor can be powered by energy sources other than the engine torque. The hoist pump can be powered by a motor, for example a traction motor, that is itself powered by an energy source other than the alternator—for example, an energy storage device. A suitable energy storage device includes, for example, a sodium metal halide battery, sodium sulfur, lithium ion battery, nickel metal hydride, nickel cadmium, and the like, as well as other energy storage mediums (capacitors, fuel cells, fly wheel devices, and the like). While the energy storage devices listed here are not entirely interchangeable, they may be selected based on the end use requirements and constraints.

In one embodiment, multiple pumps and sources optimize the system usage. Such optimization may affect one or more aspects such as, but not limited to, fuel consumption, engine emissions, hoisting time, and noise level.

Any of the embodiments set forth herein may be disposed in or implemented as or as part of an off-highway vehicle (OHV). Examples of off-highway vehicles include mining and construction equipment, dumpers and haul trucks, and the like. Embodiments are particularly applicable to large-sized haul trucks, e.g., 100-400 ton capacity, which require robust hoist systems and may benefit from enhanced flexibility and performance of the hoist system.

In any of the embodiments set forth herein involving plural motors, each motor may be provided with its own motor driver circuit/unit. Thus, for example, although FIGS. 8-12 suggest switching the output of a power electronics unit between plural motors, it could instead be the case that each motor has an individual driver, which are controlled by a controller (e.g., selectively activating or deactivating the drivers) for carrying out the control functionality described herein.

During a first mode of operation 42 (FIG. 4), the traction motor 32 or auxiliary motor 34 receives the electricity 20 from the alternator 26 and provides the mechanical power 22 to the first hoist pump 12. During a second mode of operation 44 (FIG. 5), the traction motor 32 or auxiliary motor 34 is decoupled from the first hoist pump 12, and the traction motor 32 or auxiliary motor 34 receives the electricity 20 from the alternator 26 to mechanically drive a propulsion system 36 or an auxiliary system 38, respectively, and not the first hoist pump 12.

As noted above, in certain embodiments (e.g., FIGS. 4-5), a traction motor or auxiliary motor mechanically powers a hoist pump (in one mode), and is decoupled from the hoist pump for mechanically driving a propulsion system or auxiliary system (in another mode). A traction motor or auxiliary motor may be selectively mechanically coupled and decoupled between a hoist pump and a propulsion system or auxiliary system using a controllable system that includes a transmission and/or clutch mechanism.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the disclosed subject matter without departing from its scope. While the dimensions and types of materials described herein are intended to define the parameters of the disclosed subject matter, they are by no means limiting and are exemplary embodiments. The scope of the described subject matter should, therefore, be determined with reference to the appended claims, along with the full scope of equivalents to which such claims are entitled. In the appended claims, the terms "including" and "in which" are used as the plain-language equivalents of the respective terms "comprising" and "wherein." Moreover, in the following claims, the terms "first," "second," and "third," etc. are used merely as labels, and are not intended to impose numerical requirements on their objects.

The embodiments described herein are examples of systems and methods having elements corresponding to the elements of the invention recited in the claims. This written description may enable those of ordinary skill in the art to make and use embodiments having alternative elements that likewise correspond to the elements of the invention recited in the claims. The scope of the invention thus includes articles, systems and methods that do not differ from the literal language of the claims, and further includes other articles, systems and methods with insubstantial differences from the literal language of the claims. While only certain features and embodiments have been illustrated and described herein, many modifications and changes may occur to one of ordinary skill in the relevant art. The appended claims cover all such modifications and changes.

What is claimed is:

1. A system comprising:
a first hoist pump;
an energy source comprising an alternator and an engine, the engine configured to be mechanically coupled to the alternator and mechanically decoupled from the first hoist pump, the engine operable to drive the alternator for the alternator to generate electricity; and
a first electric motor configured to be coupled to the energy source and coupled to the first hoist pump, wherein during a first mode of operation the first electric motor is configured to receive the electricity from the alternator for the first electric motor to provide mechanical power to the first hoist pump, and wherein during a second mode of operation the electricity from the energy source is used otherwise than for powering the first hoist pump; wherein:
the first electric motor is a traction motor or an auxiliary motor reversibly coupled to the first hoist pump;
during the first mode of operation the traction motor or auxiliary motor is configured to receive the electricity from the alternator and to provide the mechanical power to the first hoist pump; and
during the second mode of operation the traction motor or auxiliary motor is configured to be decoupled from the first hoist pump and to receive the electricity from the alternator for the traction motor or auxiliary motor to mechanically drive a propulsion system or an auxiliary system, respectively, and not the first hoist pump.

2. A vehicle comprising the system of claim 1.

3. The system of claim 1, further comprising a controller, wherein the controller is operable to direct the traction motor or auxiliary motor to couple to the first hoist pump in the first mode of operation and to the propulsion system or auxiliary system in the second mode of operation, and wherein the controller is operable to regulate the electricity from the alternator to the traction motor or auxiliary motor, and thereby to control a speed of the first hoist pump, in the first mode of operation.

4. The system of claim 3, wherein:
the energy source further comprises a power electronics unit electrically connected between an output of the alternator and an input of the fraction motor or auxiliary motor; and
the controller is operably connected to the power electronics unit for controlling the power electronics unit to regulate the electricity from the alternator to the traction motor or auxiliary motor.

5. A system for a vehicle, the system comprising:
a first hoist pump;
an energy source comprising an alternator and an engine, the engine configured to be mechanically coupled to the alternator and mechanically decoupled from the first hoist pump, the engine operable to drive the alternator for the alternator to generate electricity;
a first traction electric motor configured to be reversibly coupled to the energy source and coupled to the first hoist pump; and
a second traction electric motor;
wherein during a first mode of operation the first traction electric motor is configured to receive the electricity from the alternator and to provide mechanical power to the first hoist pump, and wherein during a second mode of operation the first traction electric motor is configured to be decoupled from the first hoist pump and to receive the electricity from the alternator for the first traction electric motor to mechanically drive a propulsion system of the vehicle and not the first hoist pump; and wherein
the second traction electric motor is configured to be coupled to a wheel of the vehicle such that when the first fraction electric motor is providing the mechanical power to the first hoist pump, the second traction electric motor is propelling the wheel to move the vehicle.

6. A system comprising:
a first hoist pump;
an energy source comprising an alternator and an engine, the engine configured to be mechanically coupled to the alternator and mechanically decoupled from the first hoist pump, the engine operable to drive the alternator for the alternator to generate electricity;
a first electric motor configured to be coupled to the energy source and reversibly coupled to the first hoist pump, the first electric motor comprising a traction motor or an auxiliary motor; and
a controller, wherein the controller is operable to control the first electric motor to couple to the first hoist pump in a first mode of operation where the first electric motor receives the electricity from the alternator and provides mechanical power to the first hoist pump, and wherein the controller is operable to control the first electric motor to couple to a propulsion system or an auxiliary system in a second mode of operation where the first electric motor is decoupled from the first hoist pump and receives the electricity from the alternator for the first electric motor to mechanically drive the propulsion system or the auxiliary system and not the first hoist pump;
wherein the controller is operable to regulate the electricity from the alternator to the first electric motor, and thereby to control a speed of the first hoist pump, in the first mode of operation; and
wherein in one mode of operation of the controller, the controller is configured to modify the speed of the first hoist pump without modifying speed or other operation of the engine.

7. A system comprising:
a first hoist pump;
an energy source comprising an alternator and an engine, the engine configured to be mechanically coupled to the alternator and mechanically decoupled from the first hoist pump, the engine operable to drive the alternator for the alternator to generate electricity; and
a first electric motor configured to be coupled to the energy source and coupled to the first hoist pump, wherein during a first mode of operation the first electric motor is configured to receive the electricity from the alternator and to provide mechanical power to the first hoist pump, and wherein during a second mode of operation the electricity from the energy source is used otherwise than for powering the first hoist pump; wherein:

the first electric motor is a hoist pump motor;

the system further comprises a controller and a second electric motor, and the second electric motor is a traction motor or an auxiliary motor;

the energy source further comprises a power electronics unit;

during the first mode of operation, the controller is configured to control the power electronics unit to provide the electricity to the hoist pump motor, and not to the traction motor or auxiliary motor, for the hoist pump motor to provide the mechanical power to the first hoist pump; and during the second mode of operation, the controller is configured to control the power electronics unit to provide the electricity to the traction motor or auxiliary motor, and not the hoist pump motor, for the traction motor or auxiliary motor to mechanically drive a propulsion system or an auxiliary system, respectively.

8. The system of claim 7, further comprising a second hoist pump that is mechanically coupled to the engine, directly or indirectly.

9. The system of claim 7, wherein during a third mode of operation, the controller is configured to control the power electronics unit to provide the electricity to both the hoist pump motor and to the traction motor or auxiliary motor, for the hoist pump motor to provide the mechanical power to the first hoist pump and for the traction motor or auxiliary motor to concurrently mechanically drive the propulsion system or the auxiliary system, respectively.

10. The system of claim 7, wherein the energy source further comprises an energy storage device that is electrically coupled to the power electronics unit, and wherein the controller is configured to control the energy storage device and/or the power electronics unit for the energy storage device to selectively provide the electricity to the power electronics unit.

11. A method, comprising:

operating a system in a first mode of operation, including: directing electrical power to flow from an energy source to a first electric motor, the first electric motor being coupled to the energy source and to a first hoist pump; and powering the first electric motor with the electrical power, in order for the first electric motor to provide mechanical power to the first hoist pump; and operating the system in a second mode of operation, including switching from the first electric motor providing the mechanical power to the first hoist pump to using the electrical power otherwise than for powering the first hoist pump; wherein:

the first electric motor is a traction motor;

the method further comprises, in the first mode of operation, directing the traction motor to mechanically decouple from a propulsion device and to couple to the first hoist pump, and in the second mode of operation directing the traction motor to mechanically decouple from the first hoist pump and to couple to the propulsion device;

the energy source includes an engine and an alternator, the engine driving the alternator for generating the electrical power; and the method further comprises, in the first mode of operation, the first electric motor modifying a speed of the first hoist pump without modifying speed or other operation of the engine, the first hoist pump being neither directly nor indirectly mechanically coupled to the engine.

* * * * *

UNITED STATES PATENT AND TRADEMARK OFFICE
CERTIFICATE OF CORRECTION

| | | |
|---|---|---|
| PATENT NO. | : 8,978,801 B2 | Page 1 of 1 |
| APPLICATION NO. | : 13/879728 | |
| DATED | : March 17, 2015 | |
| INVENTOR(S) | : Kumar et al. | |

It is certified that error appears in the above-identified patent and that said Letters Patent is hereby corrected as shown below:

Specification

In Column 1, Line 44, delete "Hie" and insert -- The --, therefor.

In Column 4, Line 14, delete "art" and insert -- an --, therefor.

In Column 4, Line 27, delete "starring" and insert -- starting --, therefor.

In Column 5, Line 20, delete "feat" and insert -- that --, therefor.

In Column 5, Line 27, delete "Hie" and insert -- The --, therefor.

In Column 5, Line 45, delete "rime" and insert -- time --, therefor.

In Column 5, Line 67, delete "east" and insert -- can --, therefor.

In Column 6, Line 33, delete "fraction" and insert -- traction --, therefor.

Claims

In Column 9, Line 62, in Claim 4, delete "fraction" and insert -- traction --, therefor.

In Column 10, Line 23, in Claim 5, delete "fraction" and insert -- traction --, therefor.

Signed and Sealed this
Eighth Day of December, 2015

Michelle K. Lee
*Director of the United States Patent and Trademark Office*